March 28, 1961  J. J. WILSON  2,976,887
MIXING AND VOLUME CONTROL VALVE FOR HOT AND COLD WATER
Filed May 7, 1958  4 Sheets-Sheet 1

INVENTOR.
JACK J. WILSON,
BY
McMorrow, Berman & Davidson
ATTORNEYS.

March 28, 1961 J. J. WILSON 2,976,887
MIXING AND VOLUME CONTROL VALVE FOR HOT AND COLD WATER
Filed May 7, 1958 4 Sheets-Sheet 2

INVENTOR.
JACK J. WILSON,
BY
McMorrow, Berman & Davidson
ATTORNEYS.

March 28, 1961 J. J. WILSON 2,976,887
MIXING AND VOLUME CONTROL VALVE FOR HOT AND COLD WATER
Filed May 7, 1958 4 Sheets-Sheet 3
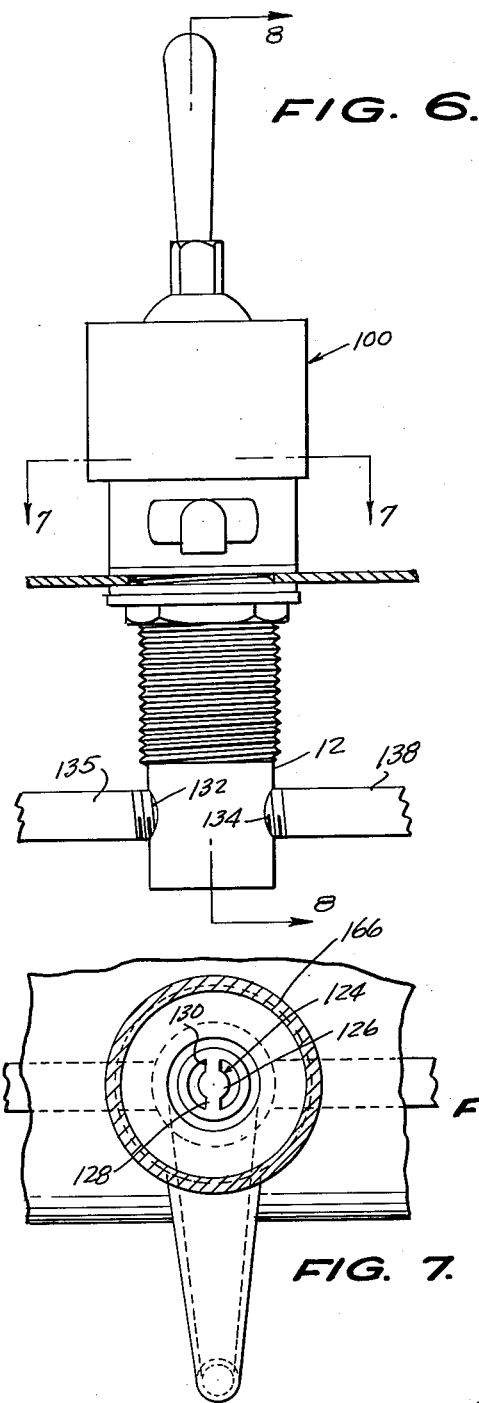
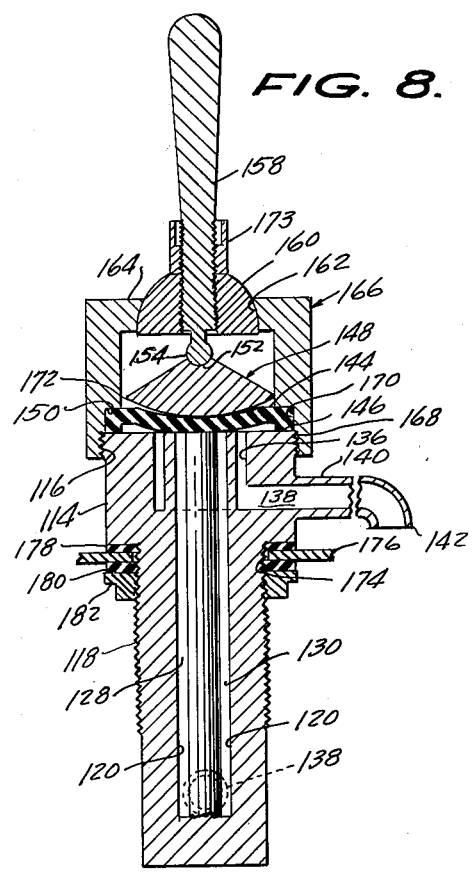
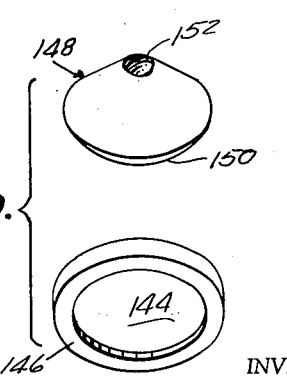
INVENTOR.
JACK J. WILSON,
BY
McMorrow, Berman + Davidson
ATTORNEYS.

March 28, 1961  J. J. WILSON  2,976,887
MIXING AND VOLUME CONTROL VALVE FOR HOT AND COLD WATER
Filed May 7, 1958  4 Sheets-Sheet 4
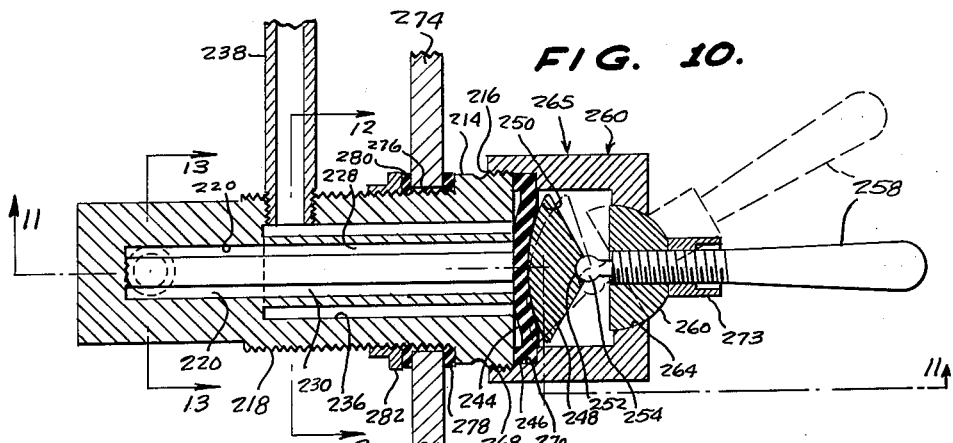
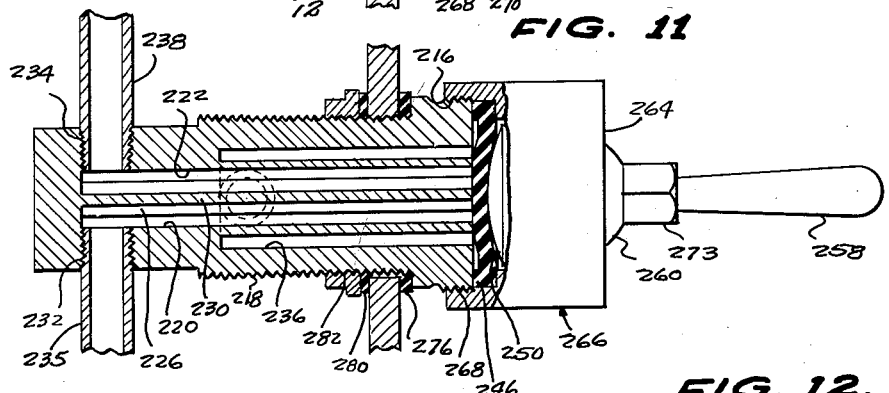
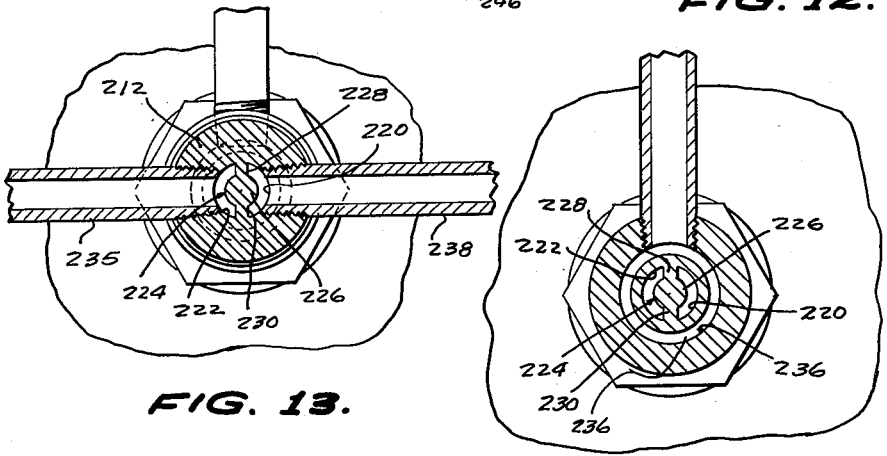
INVENTOR.
JACK J. WILSON,
BY
McMorrow, Berman & Davidson
ATTORNEYS.

United States Patent Office 2,976,887
Patented Mar. 28, 1961

2,976,887

MIXING AND VOLUME CONTROL VALVE FOR HOT AND COLD WATER

Jack J. Wilson, P.O. Box 1511, Colorado Springs, Colo.

Filed May 7, 1958, Ser. No. 733,772

9 Claims. (Cl. 137—625.4)

This invention relates to new and useful improvements in mixing and control valves for hot and cold water, and is a continuation-in-part of my co-pending application, Serial No. 667,148, filed June 21, 1957, entitled Mixing and Volume Control Valve for Hot and Cold Water.

One of the primary objects of this invention is to provide a water mixing and volume control valve wherein the volume of the discharged fluid and the temperature thereof are controlled through the operation of a single handle or lever.

A further object of this invention is to provide a valve of the type described wherein the volume of water being discharged therefrom may be increased or decreased without changing the temperature thereof and wherein the reverse is also true, that is, the temperature of the discharging fluid may be varied while maintaining a substantially constant discharge volume.

A further object of this invention is to provide a valve of the type referred to supra, which is non-complex in construction and assembly, simple to install in existing plumbing, inexpensive to manufacture, and durable in use.

Other and further objects and advantages of the present invention will become more apparent from a consideration of the following specification when read in conjunction with the annexed drawings, in which:

Figure 6 is a side elevational view of a second embodiment of a valve constructed in accordance with the teachings of this invention;

Figure 7 is a detailed cross-sectional view of the valve shown in Figure 6, Figure 7 being taken substantially on the horizontal plane of line 7—7 of Figure 6, looking in the direction of the arrows;

Figure 8 is a longitudinal, medial, cross-sectional view of the valve illustrated in Figure 1, this view being taken substanitally on the vertical plane of line 8—8 of Figure 6, looking in the direction of the arrows;

Figure 9 is an exploded perspective view of the valve disc and actuator disc;

Figure 10 is a longitudinal, medial, cross-sectional view of a third embodiment of a valve constructed in accordance with the teachings of this invention;

Figure 11 is a detailed cross-sectional view, partly in elevation, taken substantially on the line 11—11 of Figure 10, looking in the direction of the arrows;

Figure 12 is a detailed cross-sectional view taken substantially on the vertical plane of line 12—12 of Figure 10, looking in the direction of the arrows; and, Figure 13 is a detailed cross-sectional view taken substantially on the vertical plane of line 13—13 of Figure 10, looking in the direction of the arrows.

Figure 1:
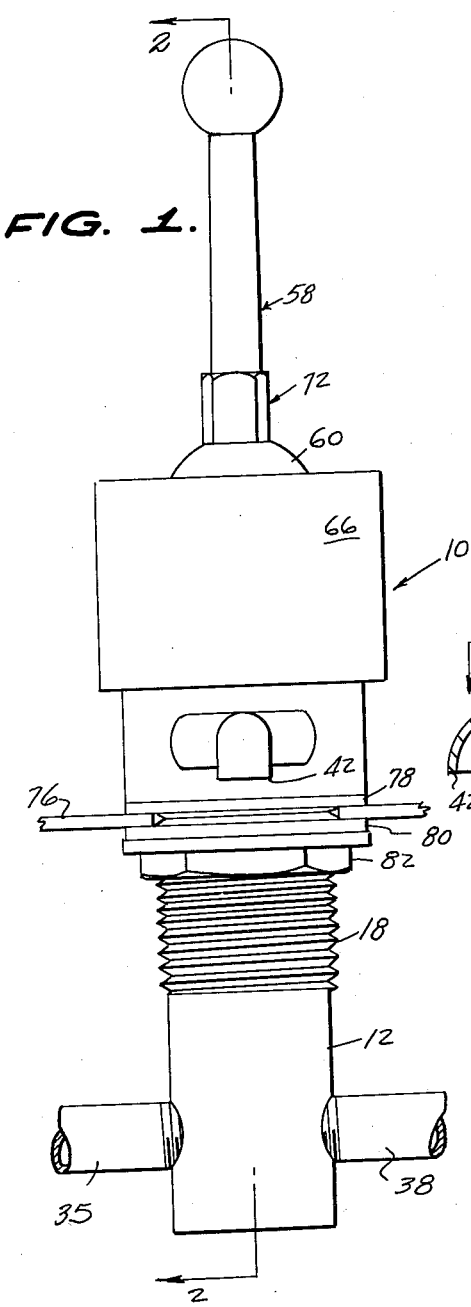
Figure 1 is a side elevational view of a valve constructed in accordance with the teachings of this invention.

Referring now more specifically to the drawings, and first to Figures 1 to 5, reference numeral 10 designates, in general, a valve constructed in accordance with the present invention. The valve 10 is seen to comprise an elongated substantially cylindrical body 12 which terminates at its upper end in an enlarged cylindrical boss 14. The boss 14 is provided with external threads 16 adjacent the upper end thereof and the body 12 is externally threaded at 18, the threads 18 originating at a point immediately adjacent the boss 14.

Figure 2:
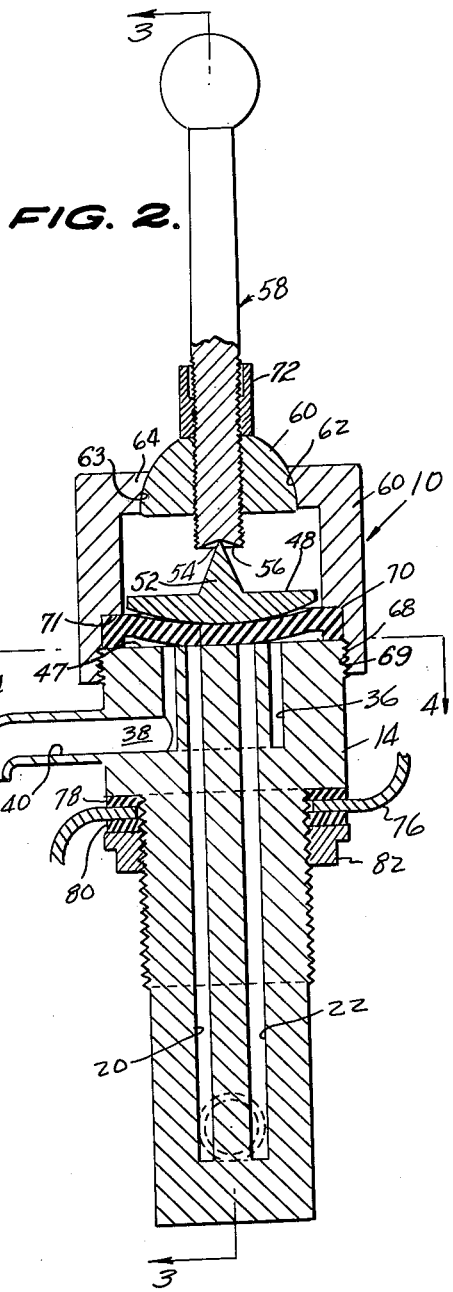
Figure 2 is a longitudinal, medial, cross-sectional view of the valve illustrated in Figure 1, this view being taken substantially on the vertical plane of line 2—2 of Figure 1, looking in the direction of the arrows.
Figure 4:
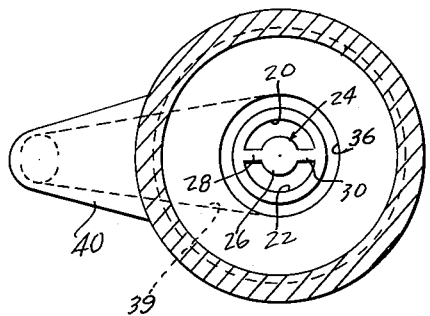
Figure 4 is a detailed cross-sectional view taken substantially on the horizontal plane of line 4—4 of Figure 2, looking in the direction of the arrows.
Figure 3:
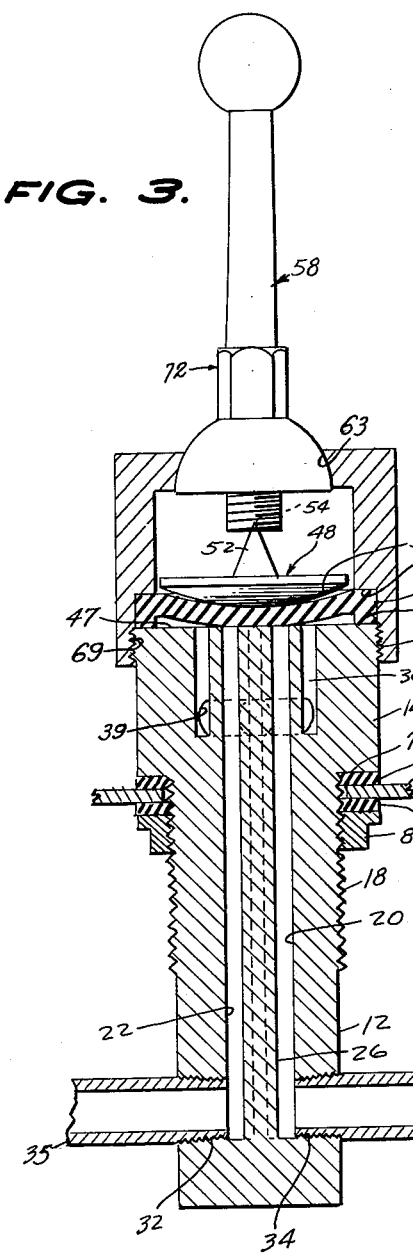
Figure 3 is a detailed cross-sectional view taken substantially on the vertical plane of line 3—3 of Figure 2, looking in the direction of the arrows.
Figure 5:
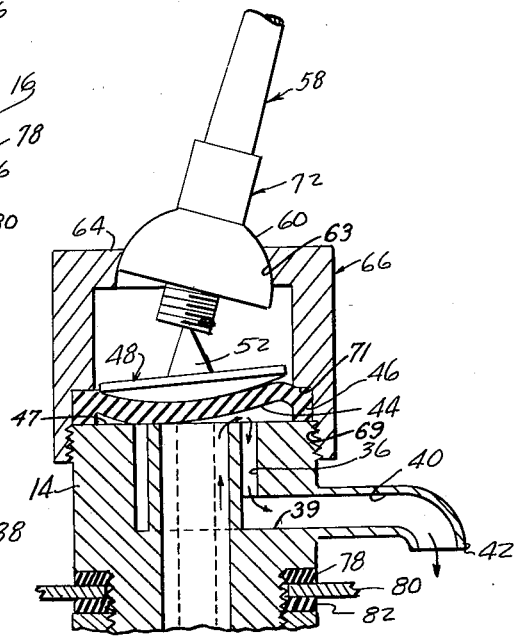
Figure 5 is a fragmentary detailed cross-sectional view illustrating the valve in one of its operable positions.

As is seen in Figures 2, 3 and 4, a pair of centrally disposed vertically extending laterally spaced arcuate passages 20, 22 extend downwardly through the boss 14 and body 12, and terminate at a point adjacent to but spaced from the lower end of the main body portion 12. The passages 20, 22 are isolated from each other by means of a diametrical separator 24 disposed therebetween. The separator 24 includes a centrally positioned axially elongated substantially cylindrical member 26 from which projects a pair of diametrically opposed radial flanges 28, 30. The cylindrical member 26 and its radial flanges 28, 30 are integrally connected with the boss 14 and the body of the valve 12. The passages 20, 22 are in communication at their lower ends, with a pair of radial threaded ports 32 and 34, respectively, the port 32 having threaded therein the end of a hot water pipe 35 and the port 34 having threaded therein the end of a cold water pipe 38.

An annular water mixing chamber 36 extends inwardly from the upper end of the boss 14 and spacedly surrounds the passages 20 and 22, and is in concentric relationship with respect to the cylindrical separator member 26. The chamber 36 is in communication with the inner end of a radial cross passage 39 in the boss 14 and communicates with the bore 40 of a discharge nozzle 42.

Reference numeral 44 designates a valve disc formed of flexible material, such as, for example, rubber, the valve disc 44 being provided with a downwardly-projecting peripheral annular flange 46. As is seen in the drawings, the flange 46 seats against the upper end 47 of the boss 14 and the valve disc 44 extends across the upper end of the passages 20 and 22, and the mixing chamber 36. Reference numeral 48 denotes, in general, a circular valve actuator disc which is provided with a convex under side 50 which engages the upper side of the valve disc 44. An upstanding substantially conical lever 52 on the center of the actuator disc 48 has an apex 54 which is received within a hollow conical recess 56 in the lower end of an elongated substantially cylindrical handle 58.

The handle 58 is threaded through a substantially hemispherical rigid guide 60 which is confined in an opening 62 formed in the upper end wall of a substantially hollow cylindrical cap 66, the opening 62 having a concave side wall 63 which is smaller in diameter at its upper end for retaining the guide 60 in the opening 62. The lower end of the cap 66 is threaded as indicated at 69, and a circumferential groove 70 is provided in the sidewall of the cap to receive therein the periphery and the flange 46 of the valve disc 44, with the top 71 of the groove bearing upon the top of the valve disc and compressing the flange 46, between the shoulder 71 and the upper end 47 of the boss 14 to effect a substantially fluid tight seal between the boss 14 and the cap 66 and anchor the valve disc 44 in place. The lower end of the handle 58 is maintained in adjusted relation relative to the apex 54 of the conical actuator disc lever 52 by means of a lock nut 72 which is threaded on the handle 58 and bears against the top of the guide 60.

To mount the valve 10 on a sink or other supporting structure an aperture 74 is formed in a wall 76 of the support, the aperture receiving therethrough the main body portion 12 of the valve 10. A gasket 78 is interposed between the lower end of the boss 14 and the adjacent side of the support 76, and a second gasket 80 is mounted on the main body portion 12 and engages against the other side of the support 76. A lock nut and washer 82 is threaded on the threads 18 and engages against the gasket 80 to fixedly clamp the valve 10 to the support 76.

The operation of the valve 10 is as follows. Let it be assumed that the hot water conduit 35 is connected with a source of hot water under pressure and that the cold water conduit is connected with the source of cold water under pressure. Under these conditions, the arcuately shaped hot water feeder passage 20 and the arcuately shaped cold water feeder passage 22 are filled with fluid under pressure.

Figures 2 and 3 show the relative association of the component elements of the valve 10 when the valve is in its closed or inoperative position. As illustrated therein, the handle element 58 has been extended into the cap 66 so that the lower end thereof engages against the apex 54 of the valve actuating lever 52. As the handle element 58 is extended into the cap 66 the valve actuator 48 is urged against the valve 44 to depress the same across the arcuately shaped passages 20, 22 and the discharge chamber 36. Thus, it follows that none of the fluid standing in the feeder passages 20 or 22 may escape into the discharge chamber 36.

Let it now be assumed that the operator desires to obtain a supply of hot water. Under this condition, and with the operator facing the nozzle 42, he grasps the handle element 58 and moves the same laterally to the left. This action causes the lever 52 and the valve actuator 48 to rock and turn in a clockwise direction (see Figure 5) whereby the resiliency of the valve 44 and the pressure of the water causes the same to move away from the upper ends of the feeder passage 22 and the discharge chamber 36 to permit a transfer of fluid therebetween. As the fluid passes into the discharge chamber 36, the same is directed through the discharge passage 38 from whence it is led by the substantially hollow conduit 40 to the fluid discharge nozzle 42. Since the valve 44 remains seated against the upper end of the cold water feeder passage 20, no fluid is discharged therefrom.

To obtain a supply of cold water, the operator pushes the handle in the diametrically opposite direction causing the conical lever 52 and the valve actuator 48 to rock and turn in the opposite direction whereby the cold water feeder passage is placed into communication with the discharge chamber 36 for eventual discharge from the nozzle 42 as described above.

Equal ratios of hot and cold water may be discharged by pivoting the handle element 58 directly forward or backward from the operator. Under this condition, equal areas of the feeder passages 20, 22 are opened by the valve 44 whereby both the hot and cold water will pass into the chamber 36 in equal volumes.

To obtain fluids of varying temperatures it is only necessary for the operator to move the handle element 58 forwardly, or rearwardly, and laterally to uncover greater or lesser areas of the upper ends of the feeder passages 20, 22.

Figures 6 to 9, inclusive, illustrate a second embodiment of this invention. In this second embodiment of the invention reference numeral 100 designates, in general, a valve which comprises an elongated substantially cylindrical main body portion 112 which terminates at its upper end in an enlarged cylindrical boss 114. The boss 114 is provided with external threads 116 adjacent the upper end thereof and the main body portion 12 is externally threaded at 118 which extend over a greater portion of its length, the threads 118 originating at a point immediately adjacent the boss 114.

A pair of centrally disposed axially extending arcuately shaped passages 120, 122 extend downwardly through the boss 114 and the main body portion 12, the passages 120 and 122 terminating at a point adjacent to but spaced from the lower end of the main body portion 112. The passages 120, 122 are isolated from each other by means of a separator 124 disposed therebetween. As is seen in Figure 7, the separator 124 includes a centrally positioned axially elongated substantially cylindrical member 126 from which projects a pair of diametrically opposed radial flanges 128, 130. The cylindrical member 126 and its radial flanges 128, 130 are integrally connected with the boss 114 and the main body portion of the valve 112. The lower ends of the passages 120, 122 are in open communication with a pair of internally threaded ports 132 and 134, respectively, the port 132 receiving therein the externally threaded end of a hot water conduit 135 and the port 134 having threaded therein the externally threaded end of a cold water conduit 138.

A substantially circular recess forming a water discharge chamber 136 extends inwardly from the upper end of the boss 114 in concentric relationship relative to the cylindrical member 126. The discharge chamber 136 is in open communication with one end of a discharge passage 138 which extends transversely through the boss 114 and communicates with the inner end of a hollow conduit 140, the latter terminating at its other end in a down turned portion to form a fluid discharge nozzle 142.

Reference numeral 114 designates a valve formed of flexible material such as, for example, rubber, the valve 144 being provided with a laterally projecting substantially circumferential flange 146. As is seen in the drawings, the flange 146 normally seats against the upper end of the boss 114 and the valve 144 extends across the upper end of the arcuately shaped passages 120, 122 and the fluid discharge chamber 136. Reference numeral 148 denotes, in general, an actuator for the valve 144. The actuator 148 is substantially conical in configuration and is provided with a convex side 150 which normally engages against the upper side of the valve 144. The valve actuator 148 at the apex thereof is formed with a downwardly extending concave socket 152. The socket 152 receives therein the spherical end member 154 which projects axially from one end of an elongated substantially cylindrical handle element 158.

The handle 158 is threaded through a substantially semi-spherical element 160, the latter being seated in an arcuate recess 162 formed in the end wall 164 of a substantially hollow cylindrical cap member 166. The open end of the cap member 166 is threaded inwardly to a point proximate a circumferential groove 170, the latter being adapted to receive therein the flange 146 and adjacent portions of the valve 144. It should now be apparent that as the threads 168 of the cap 166 are threaded over the threads 116 at the upper end of the main body portion 112, the flange 146 and adjacent portions of the valve 144 will become compressed between the shoulder 172 at the upper end of the groove 170 and the upper side of the boss 114 to effect a substantially fluid type seal between the boss 114 and the cap 166. The lower end of the handle element 158 is maintained in adjusted relation relative to the valve actuator 148 by means of a lock nut 173 which is threaded on the handle 158 and abuts against the semi-spherical member 160.

To mount the valve 110 on a sink or other supporting structure, an aperture 174 is formed in a wall 176 of the support, the aperture receiving therethrough the main body portion 112 of the valve 110. A gasket 178 is interposed between the lower end of the boss 114 and the adjacent side of the support 176, and a second gasket 180 is mounted on the main body portion 112 and engages against the other side of the support 176. A combined lock nut and washer 182 is threaded on the threads 118 and engages against the gasket 180 to fixedly clamp the valve 110 to the support 176.

The operation of the valve 110 is similar to the valve 10 and is as follows. Let it be assumed that the hot water conduit 135 is connected with a source of hot water under pressure and that the cold water conduit 138 is connected with a source of cold water under pressure. Under these conditions, the arcuately shaped hot water feeder passage 120 and the arcuately shaped cold water feeder passage 122 are filled with fluids under pressure and exert this pressure against the valve 144 tending to elevate the same from across the adjacent ends of the passages.

As is illustrated in Figure 8, the handle element 158 has been threaded into the cap 166 so that the spherical end 154 thereof engages within the socket 152 to depress the valve 144 a sufficient degree so that the same extends across the passages 120, 122, and 136. Thus, it follows that none of the fluid standing in the feeder passages 120, 122 may escape into the discharge chamber 136.

Now let it be assumed that the operator desires to obtain a supply of hot water. Under this situation, and with the operator facing the nozzle 142, he grasps the handle element 158 and moves the same laterally to the left. This action causes the valve actuator member 148 to rock and turn in a clockwise direction as viewed in Figure 8 which permits the valve 144 to rise away from the adjacent end of the passage 122 due to its inherent resilient characteristics as well as the water pressure to effect a transfer of the water within the passage 122 to the discharge chamber 136. As the fluid passes into the discharge chamber 136, the same is directed through the discharge passage 138 from whence it is led by the substantially hollow conduit 140 to the discharge nozzle 142. Since the valve 144 remains seated against the upper end of the cold water feeder passage 120, no fluid is discharged therefrom.

To obtain a supply of cold water, the operator pushes the handle in the diametrically opposite direction causing the valve actuator 148 to rock and turn on the valve 144 in the opposite direction whereby the cold water feeder passage is placed in communication with the discharge chamber 136 for eventual discharge from the nozzle 142 as described above.

Equal ratios of hot and cold water may be discharged by pivoting the handle element 158 directly forward or backward from the operator. Under this condition, equal areas of the feeder passages 120, 122 are opened by the valve 144 whereby both the hot and cold water will pass into the chamber 136 in equal volumes.

To obtain fluids of varying temperatures it is only necessary for the operator to move the handle element 158 forwardly, rearwardly, and laterally to uncover greater or lesser areas of the upper ends of the feeder passages 120, 122.

Figures 10 to 13, inclusive, illustrate a third embodiment of this invention. In this embodiment, the valve is adapted to be mounted on a vertical support such as a tile wall in a shower bath with the discharge means being concealed there behind. To this end the valve is generally designated by reference numeral 210 and is seen to comprise an elongated substantially cylindrical main body portion 212 which terminates at its upper end in an enlarged cylindrical boss 214. The boss 214 is provided with external threads 216 adjacent its upper end and the main body portion 212 is externally threaded at 218, the threads extending over a greater portion of its length and originating at a point immediately adjacent the boss 214.

A pair of centrally disposed axially extending arcuately shaped passage 220, 222 extend downwardly through the boss 214 and the main body portion 212, the passages 220 and 222 terminating at a point adjacent to but spaced from the lower end of the main body portion 212. The passages 220, 222 are isolated from each other by means of a separator 224 disposed therebetween and which includes a centrally positioned axially elongated substantially cylindrical member 226 from which project a pair of diametrically opposed radial flanges 228, 230. The cylindrical member 226 and its radial flanges 228, 230 are integrally connected with the boss 214 and the main body portion of the valve 212. The lower ends of the passages 220, 222 are in open communication with a pair of internally threaded ports 232 and 234, respectively, the port 232 receiving therein the externally threaded end of a hot water conduit 235 and the port 234 having threaded therein the externally threaded end of a cold water conduit 238.

A substantially circular recess forming a water discharge chamber 236 extends inwardly from the outer end of the boss 214 in concentric relation relative to the cylindrical member 226. As will be seen from the drawing the discharge chamber 236 extends inwardly a greater distance than the discharge chambers 36 and 136 of the previously described embodiments of this invention. The discharge chamber 236 is in open communication with one end of a fluid discharge conduit 238, the other end of the conduit 238 being connected with a shower head or other fluid discharge means not shown.

Reference numeral 244 designates a valve formed of flexible material such as, for example, rubber, the valve 244 being provided with a laterally projecting substantially circumferential flange 246. As is seen in the drawings, the flange 246 seats against the upper end of the boss 214 and the valve 244 extends across the upper end of the arcuately shaped passages 220, 222 and the fluid discharge chamber 236. Reference numeral 248 denotes, in general, a valve actuator. The valve actuator 248 is substantially conical in configuration and is provided with a convex side 250 which is adapted to engage against and rock on the upper side of the valve 244. The apex of the concially shaped valve actuator 248 is provided with a socket or recess 252 to receive the ball shaped or spherical end 254 which projects longitudinally from one end of an elongated substantially cylindrical handle element 258.

As in the preceding embodiments of this invention, the handle 258 is threaded through a substantially semispherical element 260, the latter being seated in an arcuate recess 262 formed in the end wall of a substantially hollow cylindrical cap member 266. The open end of the cap member 266 is threaded inwardly to a point proximate a circumferential groove 270, the latter being adapted to receive therein the flange 246 and adjacent portions of the valve 244. It should now be apparent that as the threads 268 are threaded over the threads 216, the flange 246 and adjacent portions of the valve 244 will become compressed between the shoulder 272 at the upper end of the groove 270 and the upper side of the boss 214 to effect a substantially fluid tight seal between the boss 214 and the cap 266. The lower end of the handle element 258 is maintained in adjusted relation relative to the apex of the valve actuator 248 by means of a lock nut 273 which is threaded on the handle 258 and abuts against the semi-spherical member 260. To mount the valve 210 on a tile wall or other similar vertical support, a tile wall 274 is apertured at 276 to receive therethrough the main body portion 212 of the valve 210. A gasket 278 is interposed between the boss 214 and the adjacent side of the wall 274, and a second gasket 280 is mounted on the main body portion 212 and engages against the other side of the support wall 274. A combined lock nut and washer 282 is threaded on the threads 218 and engages against the gasket 280 to fixedly clamp the valve 210 to the support wall 274.

The operation of the above described third embodiment of this invention is identical to the two embodiments thereof previously described, however, in this instance, the water released by the valve 210 passes into the discharge conduit 238 which is located behind the support wall 274.

Having described and illustrated three embodiments of this invention in detail, it is to be understood, that the same are offered merely by way of example, and that the instant invention is to be limited only by the scope of the appended claims.

What is claimed is:

1. A mixing and volume control valve comprising an elongated member having a pair of laterally spaced elongated passages extending longitudinally therein from an end thereof, said member having a recess extending inwardly from said one end and surrounding said passages, said member having a fluid discharge passage extending transversely therethrough with an end thereof in open communication with said recess, means connecting each of said passages, respectively, with a source of fluid under pressure, said fluids having differing temperatures, a resilient valve supported on said one end of said member in spaced relation relative thereto, a rockable valve actuator having a convex side thereof normally engaging and depressing said valve towards the adjacent ends of said passages and said recess to seal said valve thereacross, said valve actuator being rockable on said resilient valve, and manually operable means engaging said valve actuator to impart a rocking movement to said valve actuator whereby a portion of said resilient valve moves away from one or the other of said adjacent ends of said passages or away from both of said ends of said passages in accordance with the preselected direction of movement of said last named means whereby one or the other or both of said fluids may pass between the raised portion of said valve and the adjacent portions of said one end of said member and into said recess for discharge through said discharge slot.

2. A mixing and volume control valve comprising an elongated body having a pair of laterally spaced longitudinally extending passages extending inwardly from an end thereof, said body having a recess extending inwardly from said end and surrounding said passages for a portion of their respective length, said body having a fluid discharge passage extending transversely therethrough and communicating with said recess, means connecting each of said passages, respectively, with a fluid source under pressure, said fluids normally having differing temperatures, the resilient valve extending across said one end of said body in spaced relation relative thereto, a rockable valve actuator having a convex side engaging against and depressing said valve in sealing relation relative to the adjacent ends of said passages and said recess, swivel means connected with said actuator to rock and to unseat said valve from across one or the other of said ends of said passages whereby fluid passes between said valve and adjacent portions of said one end of said body into said recess for discharge through said fluid discharge passage to the exclusion of fluid discharge from the other of said fluid passages, and optionally to actuate said swivel means to rock and to unseat said valve from across preselected areas of said adjacent ends of said fluid passages to permit fluids from both of said passages to pass between said valve and adjacent portions of said one end of said body for mixture in said recess, said mixed fluids being discharged from said body through said discharge passage.

3. A mixing and volume control valve comprising an elongated substantially cylindrical member having a pair of opposed ends and including a main body portion which terminates at one of its ends in an enlarged cylindrical boss, said member having a pair of laterally spaced axially extending fluid passages formed therein, said passages extending inwardly from said one end through said boss and main body portion and terminating therein adjacent the other end of said member, said boss having a substantially hollow circular recess extending inwardly from said one end and surrounding said passages, said recess comprising a fluid discharge chamber, said boss having a laterally extending fluid discharge passage formed therein and communicating with said chamber, means connecting, respectively, each of said passages with a source of fluid under pressure, each of said fluids having differing temperatures, a flexible resilient substantially circular valve having a cylindrical flange projecting laterally from a side thereof, said flange engaging said one end of said member and normally supporting said valve in spaced relation relative thereto, a substantially circular valve actuator having a convex side engaging said valve, means engaging said actuator to effect depression of said valve for sealing engagement across the adjacent ends of said passages and said chamber, said means being selectively operable to rock said valve actuator to permit a portion of said valve to move away from the adjacent end of either of said fluid passages whereby said fluid in the selected one of said passages passes into said chamber to the exclusion of the other of said fluids, and said means being selectively operable to permit a portion of said valve to move away from both of said ends of said passages in a predetermined degree whereby preselected volumes of said fluids simultaneously enter and are mixed in said chamber.

4. A mixing and volume control valve as defined in claim 3, and a substantially hollow cylindrical cap having a pair of opposed open and closed ends, means connecting said cap on said one end of said member, said selectively operable means comprising a handle extending through said closed end of said cap and into the interior thereof, and an actuating lever for said valve actuator, said lever projecting from the other side of said actuator and being engageable by said handle means.

5. A mixing and volume control valve as defined in claim 4, and means on said main body portion for fixedly securing said valve to a support.

6. A mixing and volume control valve comprising an elongated member having a pair of laterally spaced elongated passages extending longitudinally therein from an end thereof, said member having a recess extending inwardly from said one end and surrounding said passages, said member having a fluid discharge passage extending transversely therethrough with an end thereof in open communication with said recess, means connecting each of said passages, respectively, with a source of fluid under pressure, said fluids having differing characteristics, a resilient valve supported on said one end of said member in spaced relation relative thereto, a valve actuator having a substantially conical configuration and a convexly shaped base, said base normally engaging and depressing said valve towards the adjacent ends of said passages and said recess to seal said valve thereacross, said valve actuator being radially rockable on said resilient valve, and manually operable means engaging said valve actuator to impart a radial rocking movement to said valve actuator whereby a portion of said resilient valve moves away from one or the other of said adjacent ends of said passages or away from both of said ends of said passages in accordance with the preselected direction of movement of said last named means whereby one or the other or both of said fluids may pass between the raised portion of said valve and the adjacent portions of said one end of said member and into said recess for discharge through said discharge slot.

7. A mixing and volume control valve comprising an elongated substantially cylindrical member having a pair of opposed ends and including a main body portion which terminates at one of its ends in an enlarged cylindrical boss, said member having a pair of laterally spaced axially extending fluid passages formed therein, said passages extending inwardly from said one end through said boss and main body portion and terminating therein adjacent the other end of said member, said boss having a substantially hollow circular recess extending inwardly from said one end and surrounding said passages, said recess comprising a fluid discharge chamber, said boss having a laterally extending fluid discharge passage formed therein and communicating with said chamber, means connecting, respectively, each of said passages with a source of fluid under pressure, each of said fluids having differing characteristics, a flexible resilient substantially circular valve having a cylindrical flange projecting laterally from a side thereof, said flange engaging said one end of said member and normally supporting said valve in spaced relation relative thereto, a conically shaped valve actuator having a convex base engaging said valve, said valve actuator having a socket formed at the apex thereof, an elongated handle member swivelly mounted on said main body portion, said handle member terminating at one of its ends in a spherical element slidably received within said socket, said valve actuator having its convex base engaging said valve to effect depression thereof for sealing engagement across the adjacent ends of said passages in said chamber, said handle being selectively operable to rock said valve actuator in an infinite number of radial directions to permit a portion or portions of said valve to move away from the adjacent end of either of said fluid passages whereby said fluid in the selected one of said passages passes into said chamber to the exclusion of the other of said fluids, and said handle being selectively operable to permit a portion or portions of said valve to move away from both of said ends of said passages in a predetermined degree whereby preselected volumes of said fluids simultaneously enter and are mixed in said chamber.

8. A fluid mixing and control valve for two fluids of differing characteristics, comprising a valve body having two isolated laterally spaced, longitudinal passages therein and opening to one end of the body, a mixing chamber in said body opening to said one end, a fluid discharge passage leading from said chamber to the exterior of the body, a cap connected on said one end of the body, said cap having an end wall spaced from said one end and a sidewall, a handle extending through said end wall of said cap and having one end within said cap, a resilient valve disc engaged with said one end of the body and spaced from the cap end wall, a rigid actuator disc movably confined in said cap between the cap end wall and the valve disc, said actuator disc having a control lever extending toward and operatively engaged with said end of the handle, said actuator disc having a convex side forcibly engaged with the valve disc, means retaining said handle so that said handle normally occupies an erect position in which said actuator disc holds the valve disc in closing relation to the open ends of the mixing chamber and the passages, said handle being rockable to opposite sides in one vertical plane to force one side of said valve disc into closing relation to a passage while relaxing the other side of the valve disc to enable flow of fluid through only one of the passages into the mixing chamber, said handle being rockable in opposite directions in another plane to relax the valve disc to enable flow of fluid from both passages into the mixing chamber.

9. A fluid mixing and control valve for two fluids of differing characteristics, comprising a valve body having two isolated laterally spaced, longitudinal passages therein and opening to one end of the body, a mixing chamber in said body opening to said one end, a fluid discharge passage leading from said chamber to the exterior of the body, a cap connected on said one end of the body, said cap having an end wall spaced from said one end and a sidewall, a resilient valve disc engaged with said one end of the body and spaced from the cap end wall, a handle extending through said end wall of said cap and having one end within said cap, a rigid actuator disc movably confined in said cap between the cap end wall and the valve disc, said actuator disc having a control lever extending toward and operatively engaged with said end of the handle, said actuator disc having a convex side forcibly engaged with the valve disc, means retaining said handle so that said handle normally occupies an erect position in which said actuator disc holds the valve disc in closing relation to the open ends of the mixing chamber and the passages, said handle being rockable to opposite sides in one vertical plane to force one side of said valve disc into closing relation to a passage while relaxing the other side of the valve disc to enable flow of fluid through only one of the passages into the mixing chamber, said handle being rockable in opposite directions in another plane to relax the valve disc to enable flow of fluid from both passages into the mixing chamber, said valve disc having a peripheral lateral flange bearing upon said one end of the body and a central portion engaged and depressed by the convex side of the actuator disc, in the erect position of the handle and its actuator disc, against said one end if the body, said central portion being adapted to flex away from said one end of the body when the actuator disc is rocked out of erect position.

References Cited in the file of this patent

UNITED STATES PATENTS

| | | |
|---|---|---|
| 2,211,167 | Safford | Aug. 13, 1940 |
| 2,497,557 | Reeves | Feb. 14, 1950 |
| 2,497,558 | Reeves | Feb. 14, 1950 |

FOREIGN PATENTS

| | | |
|---|---|---|
| 461,964 | Germany | June 30, 1928 |